United States Patent [19]

Kikuchi et al.

[11] Patent Number: 4,889,564
[45] Date of Patent: Dec. 26, 1989

[54] MAGNETIC DISK CLEANING METHOD AND APPARATUS

[75] Inventors: Yasushi Kikuchi; Hideki Matsuzawa, both of Kanagawa, Japan

[73] Assignee: Fuji Photo Film Co., Ltd., Kanagawa, Japan

[21] Appl. No.: 93,661

[22] Filed: Sep. 8, 1987

[30] Foreign Application Priority Data

Sep. 5, 1986 [JP] Japan ............... 61-209186

[51] Int. Cl.$^4$ .............. B08B 5/02; B08B 5/04
[52] U.S. Cl. .................. 134/21; 134/25.4; 134/31; 134/36; 134/37; 134/140; 134/153; 134/199
[58] Field of Search ........ 134/21, 25.4, 31, 140, 134/153, 199, 36, 37; 15/302, 306 A, 310, 311, 405

[56] References Cited

U.S. PATENT DOCUMENTS

| 4,202,071 | 5/1980 | Scharpf ............ 15/302 |
| 4,675,053 | 6/1987 | McCarty et al. ...... 15/302 |
| 4,720,248 | 4/1988 | Thro et al. .......... 134/21 |

FOREIGN PATENT DOCUMENTS

| 0009128 | 1/1985 | Japan ............ 134/21 |
| 0131461 | 6/1986 | Japan ............ 134/21 |
| 162873 | 7/1986 | Japan . |
| 1008584 | 3/1983 | U.S.S.R. ......... 134/21 |

Primary Examiner—Asok Pal
Attorney, Agent, or Firm—Sughrue, Mion, Zinn, Macpeak & Seas

[57] ABSTRACT

A method of cleaning a magnetic disk comprises the steps of rotating a magnetic disk housed in a cage, feeding a gas into the case, and at the same time sucking the gas from the inside of the case via window openings formed in upper and lower surfaces of the case, whereby the efficiency of discharge of dust from the case is improved by interaction of the gas feeding with the gas suction. An apparatus for cleaning a magnetic disk comprises a rotation shaft for rotating a magnetic disk housed in a case. The rotation shaft is provided with a gas passageway in the inside, and a gas discharging hole which is formed near a leading end portion to communicate with the gas passageway and which is opened inward of the case. A gas feeder is disposed for feeding gas into the gas passageway, and two gas suction devices for sucking gas from the case in the course of rotation of the magnetic disk are disposed to face respectively window openings formed in upper and lower surfaces of the case.

7 Claims, 1 Drawing Sheet

MAGNETIC DISK CLEANING METHOD AND APPARATUS

BACKGROUND OF THE INVENTION

1. Field of the Invention

This invention relates to a method of cleaning a magnetic disk for removing dust, debris or the like clinging to surfaces of a magnetic disk in a process of making the magnetic disk, and an apparatus for carrying out the method.

2. Description of the Prior Art

In general, magnetic disks, particularly flexible magnetic disks, are housed in flat and compact cases so that no dust, debris or the like clings thereto. Also, liners which are generally formed of a nonwoven fabric are adhered to inner walls of the case for wiping off dust, debris or the like on the surfaces of the magnetic disk while the magnetic disk is being rotated.

However, with the manufacturing and assembly process wherein the aforesaid magnetic disk is housed in a case, the liners are caused to vibrate by mechanical impact in the course of assembly, particularly by ultrasonic waves in the case where upper and lower halves of the case are adhered to each other by ultrasonic fusion. As a result, minute fragments of the liners come off and cling to the surface of the magnetic disk. Thus the liners which should act to wipe off dust, debris or the like rather constitute a source of dust, debris or the like.

When the magnetic disk stained by minute fragments of the liners is used for recording and reproduction, the minute liner fragments are caught between the magnetic disk and a magnetic head and cause drop-outs to occur.

SUMMARY OF THE INVENTION

The primary object of the present invention is to provide a method of cleaning a magnetic disk which enables prevention of drop-outs in the course of magnetic recording and reproduction by removing dust such as minute fragments of liners from the surface of the magnetic disk.

Another object of the present invention is to provide an apparatus for carrying out the method.

The present invention provides a method of cleaning a magnetic disk, which comprises the steps of:

(i) rotating a magnetic disk housed in a case,
(ii) feeding a gas into said case, and at the same time
(iii) sucking the gas from the inside of said case via window openings formed in upper and lower surfaces of said case, whereby the efficiency of discharge of dust, debris or the like from the inside of said case is improved by interaction of the gas feeding with the gas suction.

The present invention also provides an apparatus for cleaning a magnetic disk, which comprises:

(i) a rotation shaft for rotating a magnetic disk housed in a case, said rotation shaft being provided with a gas passageway in the inside, and a gas discharging hole formed near a leading end portion so that said gas discharging hole communicates with said gas passageway and is opened inward of said case,
(ii) a gas feed means for feeding a gas into said gas passageway, and
(iii) a pair of gas suction means for sucking said gas from the inside of said case in the course of rotation of said magnetic disk, said gas suction means being disposed to face respectively with window openings formed in upper and lower surfaces of said case, whereby minute liner fragments clinging to the surface of said magnetic disk are separated therefrom by a stream of said gas flowing from said gas discharging hole toward the inside of said case, and are ejected out of said case by gas suction with said gas suction means from the inside of said case.

With the method of and apparatus for cleaning a magnetic disk in accordance with the present invention, a gas is fed into the case to separate dust such as minute fragments of liners clinging to the surface of the magnetic disk by means of streams of the gas and, at the same time, the gas including dust is sucked from the inside of the case, thereby to eject dust such as minute fragments of liners clinging to the surface of the magnetic disk out of the case by interaction of gas feed and gas suction. Also, suction is carried out while the magnetic disk is being rotated, so that the magnetic disk is cleaned over the overall recording region thereof. Therefore, no dust is caught between the magnetic disk and a magnetic head when the magnetic disk is later used for signal recording and reproduction, and generation of drop-outs can be prevented.

Also, since the gas is sucked from both sides of the case, there is no risk of the magnetic disk being pulled up or down by gas suction even though the window openings formed in the upper and lower case halves are aligned with each other. Thus cleaning can be carried out while the magnetic disk is maintained in the neutral condition.

The case is formed by adhering the upper and lower case halves to each other by ultrasonic fusion or the like so that the magnetic disk can be housed therein. Also, liners formed of a nonwoven fabric are secured to inner walls of the case for wiping off dust, debris or the like clinging to the surfaces of the magnetic disk while the magnetic disk is being rotated. The term "case" as used herein also embraces a jacket.

By the term "gas" is meant air, or a general gas such as nitrogen gas or freon gas.

As the window openings, there should preferably be utilized openings into which a magnetic head of an external apparatus is to be inserted to access the magnetic disk in the course of signal recording on the magnetic disk and signal reproduction therefrom.

The gas feed means should be capable of discharging a gas at a flow rate of, for example, approximately 0.03 $m^3$/min from the gas discharging hole formed near the leading end of the rotation shaft for rotating the magnetic disk The gas passageway may be formed over the overall length of the rotation shaft or over only a part thereof.

Though only a single gas discharging hole may be provided, a plurality of gas discharging holes should preferably be formed at approximately equal intervals around the rotation shaft.

A pair of the gas suction means should be capable of achieving gas suction at a flow rate of approximately 0.5 $m^3$/min by upper and lower suction means for example, though the gas suction flow rate will differ with the amount of dust, debris or the like clinging to the surface of the magnetic disk and other factors.

The cleaning time may be adjusted in accordance with the amount of dust, debris or the like clinging to the surface of the magnetic disk and other factors, and may be adjusted to approximately two seconds, for example.

DESCRIPTION OF THE PREFERRED EMBODIMENTS

The present invention will hereinbelow be described in further detail with reference to the accompanying drawings.

Figure 1:
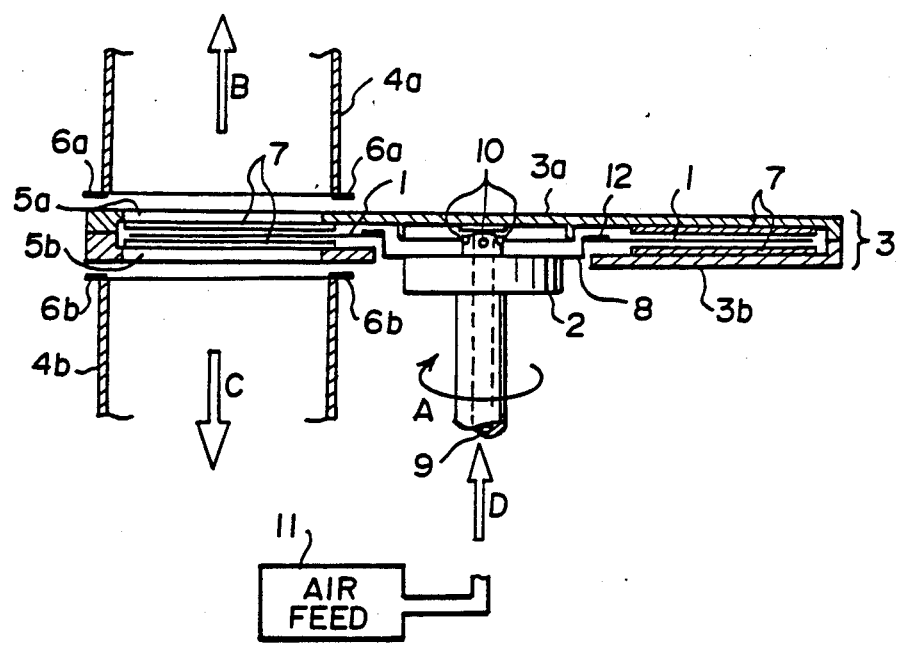
FIG. 1 is a sectional view showing an embodiment of the apparatus for cleaning a magnetic disk in accordance with the present invention.

Referring to FIG. 1, an embodiment of the apparatus for cleaning a magnetic disk in accordance with the present invention comprises a rotation attachment 2 for rotating a magnetic disk (hereinafter referred to as a magnetic sheet) 1 of a 3.5" micro-floppy disk, and two air suction nozzles 4a and 4b as a gas suction means for sucking air from a case 3 via openings 5a and 5b into which the magnetic head is to be inserted and which are formed respectively in an upper case half 3a and a lower case half 3b for housing the magnetic sheet 1. The embodiment is also provided with an air feeder 11 as a gas feed means for feeding a gas into a rotation shaft of the rotation attachment 2.

The rotation shaft of the rotation attachment 2 is provided with a gas passageway 9 and gas discharging holes 10, 10, . . . and is thus formed as a hollow shaft. The gas discharging holes 10, 10, . . . are disposed above a core 12. The embodiment is also provided with stops 6a and 6b for locating the air suction nozzles 4a and 4b at predetermined positions in the course of air suction by the gas discharging holes 10, 10, . . .

The openings 5a and 5b into which the magnetic head is to be inserted have a length at least corresponding to the radial width of a recording region of the magnetic sheet 1. Also, the air suction nozzles 4a and 4b are provided with suction holes having a width at least approximately equal to the lengths of the openings 5a and 5b into which the magnetic head is to be inserted.

The method of cleaning the magnetic sheet 1 by use of the embodiment shown in FIG. 1 will be described hereinbelow. First, the magnetic sheet 1 is placed on the rotation attachment 2. At this time, the air suction nozzles 4a and 4b are moved away from each other from the positions shown in FIG. 1 to facilitate loading of the magnetic sheet 1.

Thereafter, the air suction nozzles 4a and 4b are moved toward the magnetic sheet 1 and are stopped when leading ends of the air suction nozzles 4a and 4b arrive at the positions of the stops 6a and 6b. At this time, the suction holes of the air suction nozzles 4a and 4b respectively face the openings 5a and 5b into which the magnetic head is to be inserted and which are formed in the case 3. The distance between the magnetic sheet 1 and each of the stops 6a and 6b may be adjusted to an appropriate value that takes into consideration the amount of dust, debris or the like clinging to the surface of the magnetic sheet 1, the suction time, and other factors.

Then, the rotation attachment 2 is rotated in the direction as indicated by the arrow A to rotate the magnetic sheet 1 in this direction. At the same time, air is fed from the air feeder 11 in the direction as indicated by the arrow D, and is discharged from the gas discharging holes 10, 10, . . . into the case 3 via the gas passageway 9. Also, air is sucked in the directions as indicated by the arrows B and C by the air suction nozzles 4a and 4b. The other end portions of the suction holes of the air suction nozzles 4a and 4b, i.e. the end portions thereof farther from the case 3, are connected to an appropriate air suction source. As a result, air discharged from the gas discharging holes 10, 10, . . . flows mainly along the upper surface of the magnetic sheet 1 and is sucked mainly by the air suction nozzle 4a. At this time, the rotation speed of the magnetic sheet 1 is adjusted to a value within the range of approximately 400 to 800 rpm, preferably to 600 rpm. The total flow rate of gas discharged from the gas discharging holes 10, 10, . . . is adjusted to a value within the range of approximately 0.01 to 0.05 $m^3$/min, preferably to 0.03 $m^3$/min. The total flow rate of air sucked by the air suction nozzles 4a and 4b is adjusted to approximately 0.5 $m^3$/min, and the cleaning time is adjusted to approximately two seconds.

The floppy disk assembly or the like as shown in FIG. 1 is subjected to ultrasonic fusion for adhering the upper case half 3a and the lower case half 3b to each other in the assembly process. However, minute liner fragments are caused by vibration arising in the course of ultrasonic fusion to come off liners 7, 7, which are secured to inner walls of the case 3 for protection of the surface of the magnetic sheet 1, onto the surface of the magnetic sheet 1 and cling thereto When the magnetic sheet 1 stained with such minute liner fragments is used for signal recording and reproduction, drop-outs occur. However, with the embodiment shown in FIG. 1 wherein dust such as minute liner fragments clinging to the surface of the magnetic sheet 1 in the course of ultrasonic fusion is removed from the surfaces of the magnetic sheet 1 by gas fed from the gas discharging holes 10, 10, . . . and air suction by the air suction nozzles 4a and 4b, it is possible to prevent generation of drop-outs. Also, decrease in pressure in the space above the core 12 in the case 3 can be prevented, and thus consistent gas streams can be generated inside of the case 3. Therefore, uniform dust removal can be achieved over the overall surface of the magnetic sheet 1.

Figure 2:
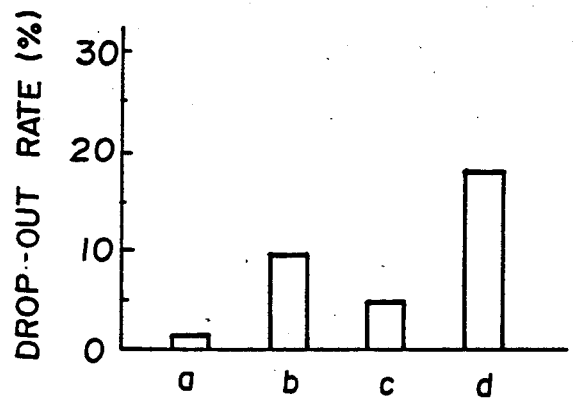
FIG. 2 is a graph showing the effect of the embodiment shown in FIG. 1 in decreasing the drop-out occurrence rate.

FIG. 2 shows the effect of the embodiment shown in FIG. 1 in decreasing the drop-out occurrence rate. In FIG. 2, "a" is the case wherein cleaning is carried out by utilizing both air feed and air suction, "b" is the case wherein cleaning is carried out by utilizing only air feed, "c" is the case wherein cleaning is carried out by utilizing only air suction, and "d" is the case wherein no cleaning is carried out. As is clear from FIG. 2, the embodiment shown in FIG. 1 has a marked cleaning effect by the synergistic action of gas feed and air suction, and can decrease the drop-out occurrence rate to approximately 1/10 as compared with the case where no cleaning is carried out. By the term "drop-out" as used herein is meant such a condition that the ratio of (minimum track output voltage)/(mean track output voltage) as the reading output is not more than 50% after a 250 kHz rectangular wave signal is written on each track of the magnetic sheet 1.

The size of the magnetic sheet 1 and the shape of the case 3 are not necessarily limited to those in the aforesaid embodiment.

The rotation speed of the magnetic sheet 1, the gas feed rate, the air suction flow rate, and the cleaning time are not limited to those in the aforesaid embodiment, and may be adjusted to appropriate values in accordance with the amount of dust, debris or the like clinging to the surface of the magnetic sheet 1 and other factors.

In the aforesaid embodiment, after the magnetic sheet 1 is placed on the rotation attachment 2, the air suction nozzles 4a and 4b are moved toward the magnetic sheet 1, thereby to facilitate loading of the magnetic sheet 1. Instead, the distance between the air suction nozzles 4a and 4b may be fixed, and the rotation attachment 2 on which the magnetic sheet 1 has been placed may be moved in the radial direction of the magnetic sheet 1.

We claim:

1. A method of cleaning a magnetic disk, which comprises the steps of:
    (i) rotating a magnetic disk housed in a case, wherein said magnetic disk is housed in said case during recording and reproduction operations,
    (ii) feeding a gas into said case, and at the same time
    (iii) sucking the gas from the inside of said case via window openings formed in upper and lower surfaces of said case.

2. A method as defined in claim 1 wherein said window openings are openings into which a magnetic head is to be inserted.

3. An apparatus for cleaning a magnetic disk, which comprises:
    (i) a rotation shaft for rotating a magnetic disk housed in a case, said rotation shaft being provided with a gas passageway in the inside, and a gas discharging hole formed near a leading end portion said gas discharging hole communicating with said gas passageway and opened inward of said case,
    (ii) a gas feed means for feeding a gas into said gas passageway, and
    (iii) two gas suction means for sucking said gas from the inside of said case in the course of rotation of said magnetic disk, said gas suction means being disposed to face respectively window openings formed in upper and lower surfaces of said case.

4. An apparatus as defined in claim 3 wherein said gas feed means feeds gas from said gas discharging hole at a gas flow rate of approximately 0.03 $m^3$/minute.

5. An apparatus as defined in claim 3 wherein said gas suction means suck the gas at a total flow rate of approximately 0.5 $m^3$/minute.

6. An apparatus as defined in claim 3 wherein said window openings are openings into which a magnetic head is to be inserted.

7. An apparatus as defined in claim 3 wherein said rotation shaft is provided with a plurality of said gas discharging holes formed at approximately equal intervals around said rotation shaft.

* * * * *